(12) United States Patent
Choi

(10) Patent No.: US 9,921,433 B2
(45) Date of Patent: Mar. 20, 2018

(54) ARRAY SUBSTRATE, LIQUID CRYSTAL DISPLAY PANEL AND DISPLAY DEVICE

(71) Applicant: BOE TECHNOLOGY GROUP CO., LTD., Beijing (CN)

(72) Inventor: Hyunsic Choi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/415,814

(22) PCT Filed: Apr. 30, 2014

(86) PCT No.: PCT/CN2014/076619
§ 371 (c)(1),
(2) Date: Jan. 20, 2015

(87) PCT Pub. No.: WO2015/081659
PCT Pub. Date: Jun. 11, 2015

(65) Prior Publication Data
US 2016/0011466 A1    Jan. 14, 2016

(30) Foreign Application Priority Data
Dec. 6, 2013   (CN) .......................... 2013 1 0659075

(51) Int. Cl.
*H01L 27/14*   (2006.01)
*H01L 29/04*   (2006.01)
(Continued)

(52) U.S. Cl.
CPC ...... *G02F 1/134309* (2013.01); *G02F 1/1368* (2013.01); *G02F 1/136227* (2013.01);
(Continued)

(58) Field of Classification Search
None
See application file for complete search history.

(56) References Cited

U.S. PATENT DOCUMENTS 6,069,678 A    5/2000 Sakamoto et al.
8,169,579 B2   5/2012 Kim
(Continued)

FOREIGN PATENT DOCUMENTS

CN    101078824 A    11/2007
CN    102033367 A     4/2011
(Continued)

OTHER PUBLICATIONS

Search Report issued in International Application No. PCT/CN2014/076619, twelve (12) pages.
(Continued)

*Primary Examiner* — Ismail Muse
(74) *Attorney, Agent, or Firm* — Nath, Goldberg & Meyer; Joshua B. Goldberg

(57) ABSTRACT

The invention discloses an array substrate, a liquid crystal display panel and a display device, since the first shield electrode, which intents to shield instantaneous electromagnetic signals in a data signal line, and a pixel electrode are provided in the same layer, compared to the existing array substrate in which the shield electrode and a common electrode are provided in the same layer, since the pixel electrode is closer to the data signal line, through the first shield electrode, the light leakage phenomenon can be effectively prevented from occurring in the array substrate, and the color mixing phenomenon of the array substrate can be alleviated, and further the distance between the first shield electrode provided in the same layer as the pixel electrode and the data signal line can be decreased, and the width of the first shield electrode is decreased.

20 Claims, 2 Drawing Sheets

(51) Int. Cl.
*H01L 29/15* (2006.01)
*H01L 31/036* (2006.01)
*G02F 1/1343* (2006.01)
*G02F 1/1362* (2006.01)
*G02F 1/1368* (2006.01)
*G02F 1/1333* (2006.01)

(52) U.S. Cl.
CPC .. *G02F 1/136286* (2013.01); *G02F 1/133345* (2013.01); *G02F 2001/134318* (2013.01); *G02F 2001/134372* (2013.01); *G02F 2001/136218* (2013.01)

(56) References Cited

U.S. PATENT DOCUMENTS

| | | | |
|---|---|---|---|
| 2002/0131003 A1 | 9/2002 | Matsumoto | |
| 2006/0138419 A1* | 6/2006 | Lee | G02F 1/136227 257/59 |
| 2006/0215071 A1* | 9/2006 | Shin | G02F 1/1362 349/44 |
| 2008/0149931 A1* | 6/2008 | Koyama | G02F 1/1368 257/59 |
| 2009/0268145 A1* | 10/2009 | Anjo | G02F 1/134363 349/141 |
| 2013/0057813 A1* | 3/2013 | Jeong | G02F 1/134309 349/110 |
| 2013/0126863 A1* | 5/2013 | Yamazaki | H01L 27/12 257/43 |
| 2013/0215341 A1* | 8/2013 | Rho | G02F 1/134309 349/15 |
| 2014/0333852 A1* | 11/2014 | Ishikawa | G06F 3/044 349/12 |
| 2015/0168793 A1* | 6/2015 | Oh | G02F 1/133707 349/110 |
| 2015/0268515 A1* | 9/2015 | Seo | G02F 1/133788 349/129 |

FOREIGN PATENT DOCUMENTS

| | | |
|---|---|---|
| CN | 102569187 A | 7/2012 |
| CN | 103309099 A | 9/2013 |
| CN | 103676374 A | 3/2014 |
| JP | 2002296615 A | 10/2002 |
| JP | 2011048394 A | 3/2011 |
| KR | 20110074036 A | 6/2011 |
| WO | 2012/118513 A1 | 9/2012 |

OTHER PUBLICATIONS

Chinese Office Action dated Aug. 31, 2015 issued in corresponding Chinese Application No. 201310659075.6.

* cited by examiner

ARRAY SUBSTRATE, LIQUID CRYSTAL DISPLAY PANEL AND DISPLAY DEVICE

This is a National Phase Application filed under 35 U.S.C. 371 as a national stage of PCT/CN2014/076619, filed Apr. 30, 2014, and claims priority benefit from Chinese Application No. 201310659075.6, filed Dec. 6, 2013, the content of each of which is hereby incorporated by reference in its entirety.

FIELD OF THE INVENTION

The present invention relates to the field of display technology, in particular to an array substrate, a liquid crystal display panel and a display device.

BACKGROUND OF THE INVENTION

Liquid crystal display technology is developing rapidly, and becomes a new star in industry and a highlight in economic development. In the vigorous development of liquid crystal display technology, wide viewing angle, high display quality and fast response speed etc. become urgent requirements on a liquid crystal display device. At present, Advanced Super Dimension Switch (ADSDS, abbreviated as ADS) type liquid crystal display technology has become a research hotspot in recent years due to its wide viewing angle, high display quality and fast response speed etc.

In an ADS liquid crystal display technology, a multidimensional electric field is formed of an electric filed formed between edges of slit-shaped electrodes in the same layer and an electric field formed between the slit-shaped electrode layer and the plate-shaped electrode layer, so that all oriented liquid crystal molecules between slit-shaped electrodes and above the electrodes in the liquid crystal cell can rotate, so as to improve the work efficiency of the liquid crystal molecules and increase the light transmittance. For different applications, improvements on the ADS technology include a high transmittance I-ADS technology, a high aperture ratio H-ADS technology and a high resolution S-ADS technology etc.

The existing H-ADS type or S-ADS type array substrate is shown in FIG. 1, and includes a base substrate 1, a thin film transistor 2, a data signal line 3, and a pixel electrode 4 and a common electrode 5 which are insulated from each other; wherein the thin film transistor 2 includes a gate electrode 21, a gate insulating layer 22, an active layer 23 and a source electrode and a drain electrode 25 provided in the same layer, which are successively provided on the base substrate 1, wherein the data signal line 3 and the drain electrode 25 are provided in the same layer, the pixel electrode 4 is electrically connected to the drain electrode 25, and the common electrode 5 is located above the pixel electrode 4, and is slit-shaped.

In a liquid crystal display device, the electromagnetic signals in the data signal line 3 may influence the deflection of the liquid crystal molecules at the region corresponding to the data signal line 3 in the display, so light leakage phenomena occurs in the display. Therefore, as shown in FIG. 1, in the H-ADS or S-ADS type array substrate, a shield electrode 6 is further provided to be in the same layer as the common electrode 5 and is electrically connected to it, and the orthographic projection of the shield electrode 6 on the base substrate 1 covers the orthographic projection of the data signal line 3 on the base substrate 1, so as to shield the electromagnetic signals in the data signal line 3 from influencing the liquid crystal molecules at the region corresponding to the data signal line 3, and prevent the light leakage phenomenon occurring in the liquid crystal display device. Moreover, in order to better shield the electromagnetic signals in the data signal line 3, the further the distance between the shield electrode 6 and the data signal line 3 is, the larger the width of the shield electrode 6 is.

In the H-ADS type array substrate, as shown in FIG. 1, a first insulating layer 7 and a second insulating layer 8 are further successively provided between the data signal line 3 and the shield electrode 6, and since the total thickness of the first insulating layer 7 and the second insulating layer 8 are relatively large, the width of the shield electrode 6 is relatively large, for example, when the total thickness of the first insulating layer 7 and the second insulating layer 8 is 6000 Å, the width of the shield electrode 6 needs to exceed the edge of the data signal line 3 by more than 2.5 µm. In the S-ADS type array substrate, a resin layer and a second insulating layer is successively provided between the data signal line 3 and the shield electrode 6, and since the thickness of the resin layer is larger, the width of the shield electrode 6 becomes wider, for example, when the thickness of the resin layer is 1.7 µm, and the thickness of the second insulating layer is 300 Å, the width of the shield electrode 6 needs to exceed the edge of the data signal line by more than 3.5-4.0 µm. In a high resolution liquid crystal display device, since the pixel pitch of the array substrate is small, the wider the shield electrode is, the smaller the slit width of the common electrode, within one pixel pitch range, provided in the same layer as the shield electrode is, which will increase the process difficulty in manufacturing the array substrate.

Thus, how not only to prevent the light leakage phenomena from occurring in the array substrate, and but also to decrease the process difficulty in manufacturing the array substrate has become an urgent problem to be solved.

SUMMARY OF THE INVENTION

Embodiments of the invention provide an array substrate, a liquid crystal display panel and a display device, which can effectively prevent the light leakage phenomenon from occurring in the array substrate and decrease the process difficulty in manufacturing the array substrate.

An embodiment of the invention provides an array substrate, including a base substrate, a thin film transistor and a data signal line provided on the base substrate, and a pixel electrode and a common electrode which are successively provided above the thin film transistor and are insulated from each other, wherein the thin film transistor includes an active layer, a source electrode, a drain electrode and a gate electrode, the source electrode, the drain electrode and the data signal line are provided in the same layer, and the pixel electrode is electrically connected to the drain electrode, and wherein the array substrate further includes a first shield electrode, which is provided in the same layer as the pixel electrode and is insulated from the pixel electrode, wherein an orthographic projection of the first shield electrode on the base substrate covers the orthographic projection of the data signal line on the base substrate.

In the array substrate provided by the embodiment of the invention, since the first shield electrode, which intents to shield instantaneous electromagnetic signals in the data signal line, and the pixel electrode are provided in the same layer, compared to the existing array substrate in which the shield electrode and the common electrode are provided in the same layer, since the pixel electrode is closer to the data signal line, through the first shield electrode, the light leakage phenomenon can be effectively prevented from occurring in the array substrate, and the color mixing phenomenon of the array substrate can be alleviated, and further the distance between the first shield electrode provided in the same layer as the pixel electrode and the data signal line can be decreased, and the width of the first shield electrode is decreased, and the first shield electrode is prevented from occupying too many regions of the pixel electrode provided in the same layer; moreover, the first shield electrode and the pixel electrode are provided in the same layer so as to prevent the first shield electrode from occupying the region of the common electrode, increase the width of the slit of the common electrode, and decrease the process difficulty in manufacturing the array substrate.

Preferably, in order to better prevent the light leakage phenomenon, in the array substrate provided by the embodiment of the invention, the larger the distance between the first shield electrode and the data signal line is, the larger the orthographic projection of the first shield electrode on the base substrate is.

Preferably, the array substrate provided by the embodiment of the invention further includes a second shield electrode provided in the same layer as the common electrode, wherein the second shield electrode is electrically connected to the first shield electrode, and the second shield electrode and the common electrode are applied with a common electrode signal. The second shield electrode is provided to apply the common electrode signal to the first shield electrode, so as to save a signal line which is separately provided to apply an electrical signal to the first shield electrode.

Further, in an implementation, in order to increase the width of the slit of the common electrode as far as possible, in the array substrate provided by the embodiment of the invention, the orthographic projection of the second shield electrode on the base substrate is smaller than that of the first shield electrode on the base substrate.

Preferably, in an implementation, in order to make the pixel electrode be electrically insulated from the common electrode, the array substrate provided by the embodiment of the invention further includes a first insulating layer provided between the pixel electrode and the common electrode, wherein the second shield electrode is electrically connected to the first shield electrode through a via hole penetrating through the first insulating layer, so that the common electrode signal can be applied to the second shield electrode.

Preferably, in the array substrate provided by the embodiment of the invention, the pixel electrode is slit-shaped or plate-shaped, and the common electrode is slit-shaped.

Further, when the array substrate provided by the embodiment of the invention is of an H-ADS type, the array substrate provided by the embodiment of the invention further includes a second insulating layer provided between the thin film transistor and the pixel electrode.

Alternatively, furthermore, when the array substrate provided by the embodiment of the invention is of an S-ADS type, the array substrate provided by the embodiment of the invention further includes a resin layer provided between the thin film transistor and the pixel electrode.

An embodiment of the invention further provides a liquid crystal display panel including the array substrate provided by the embodiment of the invention.

An embodiment of the invention further provides a display device including the liquid crystal display panel provided by the embodiment of the invention.

DETAILED DESCRIPTION OF THE EMBODIMENTS

Figure 1:
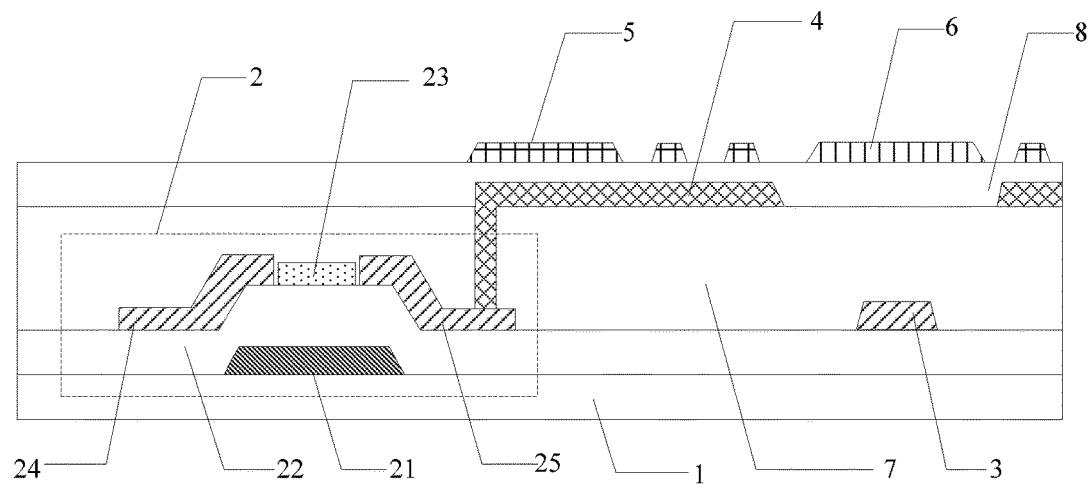
FIG. 1 is a schematic view of a structure of an array substrate in the prior art.

The particular implementations of the array substrate, the liquid crystal display panel and the display device provided by the embodiments of the invention will be described in detail below in conjunction with the accompanying drawings.

Sizes and shapes of all parts in the drawings do not reflect the true scale of the array substrate, and are intended to just schematically illustrate the contents of the invention.

Figure 2:
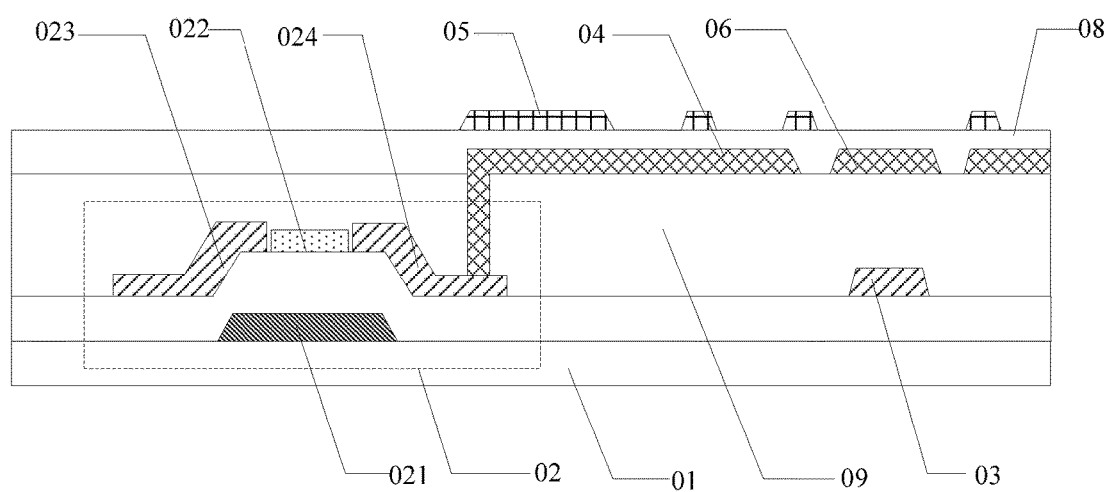
FIGS. 2*a* and *b* are schematic views of a structure of an array substrate provided by an embodiment of the invention, with FIG. 2*b* depicting a larger orthogonal distance between the first shield electrode and the data signal line than FIG. 2*a*, and an accordingly larger first shield electrode.
Figure 3:
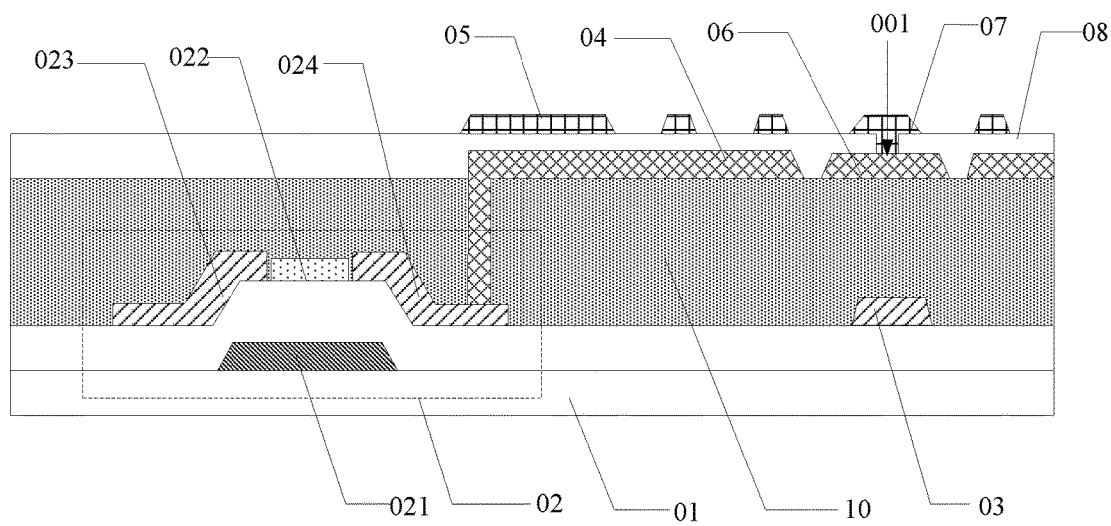
FIG. 3 is a schematic view of a structure of an array substrate provided by another embodiment of the invention.

An embodiment of the invention provides an array substrate, as shown in FIGS. 2 and 3, and the array substrate includes a base substrate 01, a thin film transistor 02 and a data signal line 03 provided on the base substrate 01, as well as a pixel electrode 04 and a common electrode 05 which are successively provided above the thin film transistor 02 and are insulated from each other, wherein the thin film transistor 02 includes a gate electrode 021, an active layer 022, a source electrode 023, and a drain electrode 024, the source electrode 023, the drain electrode 024 and the data signal line 03 are provided in the same layer, and the pixel electrode 04 is electrically connected to the drain electrode 024, and wherein the array substrate further includes a first shield electrode 06, which is provided in the same layer as the pixel electrode 04 and is insulated from the pixel electrode 04, wherein an orthographic projection of the first shield electrode 06 on the base substrate 01 covers the orthographic projection of the data signal line 03 on the base substrate 01.

In the array substrate provided by the embodiment of the invention, since the first shield electrode, which intents to shield instantaneous electromagnetic signals in the data signal line, and the pixel electrode are provided in the same layer, compared to the existing array substrate in which the shield electrode and the common electrode are provided in the same layer, since the pixel electrode is closer to the data signal line, through the first shield electrode, the light leakage phenomenon can be effectively prevented from occurring in the array substrate, and the color mixing phenomenon of the array substrate can be alleviated, in addition, the distance between the first shield electrode provided in the same layer as the pixel electrode and the data signal line can be decreased, and the width of the first shield electrode can be decreased, and the first shield electrode is prevented from occupying too many regions of the pixel electrode provided in the same layer; moreover, the first shield electrode and the pixel electrode are provided in the same layer so as to prevent the first shield electrode from occupying the region of the common electrode, increase the width of the slit of the common electrode corresponding to the opening regions of pixels, and decrease the process difficulty in manufacturing the array substrate.

Figure 4:
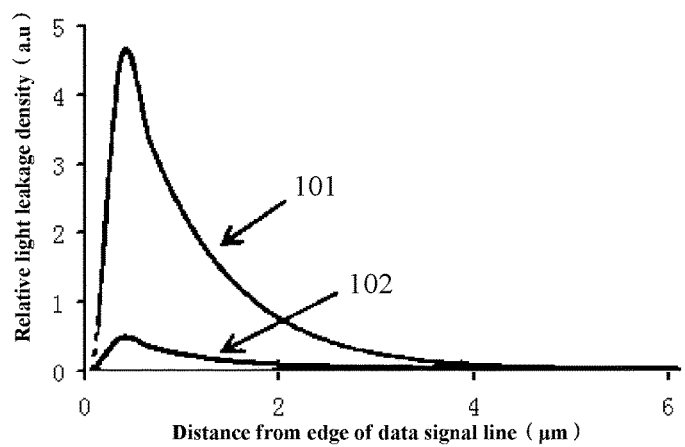
FIG. 4 is a diagram illustrating simulation results of light leakage comparison between the array substrate provided by the embodiment of the invention and the existing array substrate.

FIG. 4 illustrates the simulation results of light leakage experiments performed on the existing array substrate and the array substrate provided by the embodiment of the invention, respectively, wherein curve 101 illustrates relative light leakage density in the range of 6 µm from the edge of the data signal line for a existing array substrate, and curve 102 illustrates relative light leakage density in the range of 6 µm from the edge of the data signal line for the above array substrate provided by the embodiment of the invention. From the shown stimulation results, the array substrate provided by the embodiment of the invention can effectively prevent the light leakage phenomenon from occurring in the array substrate.

Preferably, in an implementation, in order to better prevent the light leakage phenomenon, in the array substrate provided by the embodiment of the invention, as shown in FIGS. 2 and 3, the larger the distance between the first shield electrode 06 and the data signal line 03 is, the larger the orthographic projection of the first shield electrode 06 on the base substrate 01 is.

Preferably, in an implementation, as shown in FIG. 3, the array substrate provided by the embodiment of the invention further includes a second shield electrode 07 provided in the same layer as the common electrode 05, wherein the second shield electrode 07 is electrically connected to the first shield electrode 06, and the second shield electrode 07 and the common electrode 05 are applied with a common electrode signal. The second shield electrode 07 is provided to apply the common electrode signal to the first shield electrode 06, so as to save a signal line which is separately provided to apply an electrical signal to the first shield electrode 06; and the second shield electrode 07 and the common electrode 05 are provided in the same layer, so patterns of the common electrode 05 and the second shield electrode 07 can be formed by a single patterning process, which can save additional manufacturing process, and can be achieved only by changing the pattern of the corresponding film layer without adding new manufacturing process, therefore the manufacturing procedure is simplified, the production cost is saved and the production efficiency is increased.

Further, in order to increase the width of the slit of the common electrode, in the array substrate provided by the embodiment of the invention, as shown in FIGS. 2 and 3, the orthographic projection of the second shield electrode 07 on the base substrate 01 is smaller than that of the first shield electrode 06 on the base substrate 01.

Preferably, in order to make the pixel electrode be electrically insulated from the common electrode, as shown in FIG. 3, the array substrate provided by the embodiment of the invention further includes a first insulating layer 08 provided between the pixel electrode 04 and the common electrode 05, and the second shield electrode 07 is electrically connected to the first shield electrode 06 through a via hole 001 penetrating through the first insulating layer 08, so that the common electrode signal can be applied to the second shield electrode 07.

Preferably, in the array substrate provided by the embodiment of the invention, as shown in FIGS. 2 and 3, the pixel electrode 04 may be plate-shaped, and the common electrode 05 may be slit-shaped; alternatively, in an implementation, both the pixel electrode 04 and the common electrode 05 may be slit-shaped, which is not limited herein.

Further, in an implementation, the array substrate provided by the embodiment of the invention may be an H-ADS type array substrate, or may be an S-ADS type array substrate, which is not limited herein.

In particular, when the array substrate provided by the embodiment of the invention is an H-ADS type array substrate, as shown in FIG. 2, it may further includes a second insulating layer 09 provided between the thin film transistor 02 and the pixel electrode 04.

Alternatively, in particular, when the array substrate provided by the embodiment of the invention is an S-ADS type array substrate, as shown in FIG. 3, it may further includes a resin layer 10 provided between the thin film transistor 02 and the pixel electrode 04.

Preferably, in order to facilitate the implementation, in the array substrate provided by the embodiment of the invention, as shown in FIGS. 2 and 3, the source electrode 023 and the drain electrode 024 are located above the gate electrode 021, respectively; or the gate electrode may also be located below the source electrode and the drain electrode, which is not limited herein.

Further, in a particular implementation, in the array substrate provided by the embodiment of the invention, as shown in FIGS. 2 and 3, the thin film transistor 2 may be of a bottom-gate type structure, or the thin film transistor may also be of a top-gate type structure, of course the thin film transistor may be of any other structure which can achieve the technical solution of the invention, which is not limited herein.

Based on the same inventive concept, an embodiment of the invention also provides a liquid crystal display panel including the above array substrate provided by the embodiment of the invention. All the other essential components of the liquid crystal display panel are known to persons skilled in the art, and are not elaborated herein, and should not be considered to limit the invention. For the embodiments of the liquid crystal display panel, the above embodiments of the array substrate may be referred to, and will not be repeated any longer.

Based on the same inventive concept, an embodiment of the invention also provides a display device, including the above liquid crystal display panel provided by the embodiment of the invention, and the display device may be any product or component having a display function such as a mobile phone, a tablet computer, a TV, a monitor, a notebook computer, a digital photo frame, a navigator, etc. For the implementations of the display device, the embodiments of the liquid crystal display panel may be referred to, and will not repeated any longer.

The embodiments of the invention provide an array substrate, a liquid crystal display panel and a display device, and the array substrate includes a base substrate, a thin film transistor and a data signal line provided on the base substrate, as well as a pixel electrode and a common electrode which are successively provided above the thin film transistor and are insulated from each other, wherein the thin film transistor includes an active layer, a source electrode, a drain electrode and a gate electrode, the source electrode, the drain electrode and the data signal line are provided in the same layer, and the pixel electrode is electrically connected to the drain electrode, and wherein the array substrate further includes a first shield electrode, which is provided in the same layer as the pixel electrode and is insulated from the pixel electrode, wherein an orthographic projection of the first shield electrode on the base substrate covers the orthographic projection of the data signal line on the base substrate. In the array substrate, since the first shield electrode, which intents to shield instantaneous electromagnetic signals in a data signal line, and the pixel electrode are provided in the same layer, compared to the existing array substrate in which the shield electrode and the common electrode are provided in the same layer, since the pixel electrode is closer to the data signal line, through the first shield electrode, the light leakage phenomenon can be effectively prevented from occurring in the array substrate, and the color mixing phenomenon of the array substrate can be alleviated, and further the distance between the first shield electrode provided in the same layer as the pixel electrode and the data signal line can be decreased, and the width of the first shield electrode is decreased, and the first shield electrode is prevented from occupying too many regions of the pixel electrode provided in the same layer; moreover, the first shield electrode and the pixel electrode are provided in the same layer so as to prevent the first shield electrode from occupying the region of the common electrode, increase the width of the slit of the common electrode, and decrease the process difficulty in manufacturing the array substrate.

Of course, various variations and improvements can be made by a person skilled in the art without departing from the spirit and scope of the present invention. Thus, if these variations and improvements of the invention belong to the scope of the claims and the equivalents of the invention, they are intended to be included in the invention.

The invention claimed is:

1. An array substrate, including, at a pixel area of a display region, a base substrate, a thin film transistor and a data signal line provided on the base substrate, and a pixel electrode and a common electrode which are successively provided above the thin film transistor and are insulated from each other and the common electrode is arranged above the pixel electrode, wherein the common electrode and the pixel electrode are provided within the pixel area, and wherein the thin film transistor includes an active layer, a source electrode, a drain electrode and a gate electrode, the source electrode, the drain electrode and the data signal line are provided in the same layer, and the pixel electrode is electrically connected to the drain electrode, and wherein the array substrate further includes:
   a first shield electrode, which is provided, within the pixel area, in the same layer as the pixel electrode and is insulated from the pixel electrode, wherein an orthographic projection of the first shield electrode on the base substrate completely covers an orthographic projection of the data signal line on the base substrate,
   further including a second shield electrode provided in the same layer as the common electrode, wherein the second shield electrode is electrically connected to the first shield electrode, and the second shield electrode and the common electrode are applied with a common electrode signal; and
   wherein an orthographic projection of the second shield electrode on the base substrate is smaller than that of the first shield electrode on the base substrate.

2. The array substrate of claim 1, wherein the larger the distance between the first shield electrode and the data signal line in a direction perpendicular to the array substrate is, the larger the orthographic projection of the first shield electrode on the base substrate is.

3. The array substrate of claim 1, wherein the pixel electrode is slit-shaped or plate-shaped, and the common electrode is slit-shaped.

4. The array substrate of claim 1, further including a second insulating layer provided between the thin film transistor and the pixel electrode.

5. The array substrate of claim 1, further including a resin layer provided between the thin film transistor and the pixel electrode.

6. A liquid crystal display panel, including an array substrate of claim 1.

7. A display device, including the liquid crystal display panel of claim 6.

8. The array substrate of claim 2, wherein the pixel electrode is slit-shaped or plate-shaped, and the common electrode is slit-shaped.

9. The array substrate of claim 2, further including a second insulating layer provided between the thin film transistor and the pixel electrode.

10. The array substrate of claim 2, further including a resin layer provided between the thin film transistor and the pixel electrode.

11. An array substrate, including, at a pixel area of a display region, a base substrate, a thin film transistor and a data signal line provided on the base substrate, and a pixel electrode and a common electrode which are successively provided above the thin film transistor and are insulated from each other and the common electrode is arranged above the pixel electrode, wherein the common electrode and the pixel electrode are provided within the pixel area, and wherein the thin film transistor includes an active layer, a source electrode, a drain electrode and a gate electrode, the source electrode, the drain electrode and the data signal line are provided in the same layer, and the pixel electrode is electrically connected to the drain electrode, and wherein the array substrate further includes:
   a first shield electrode, which is provided, within the pixel area, in the same layer as the pixel electrode and is insulated from the pixel electrode, wherein an orthographic projection of the first shield electrode on the base substrate completely covers an orthographic projection of the data signal line on the base substrate,
   further including a second shield electrode provided in the same layer as the common electrode, wherein the second shield electrode is electrically connected to the first shield electrode, and the second shield electrode and the common electrode are applied with a common electrode signal; and
   further including a first insulating layer provided between the pixel electrode and the common electrode, wherein the second shield electrode is electrically connected to the first shield electrode through a via hole penetrating through the first insulating layer.

12. The array substrate of claim 11, wherein the pixel electrode is slit-shaped or plate-shaped, and the common electrode is slit-shaped.

13. The array substrate of claim 11, further including a second insulating layer provided between the thin film transistor and the pixel electrode.

14. The array substrate of claim 11, further including a resin layer provided between the thin film transistor and the pixel electrode.

15. A liquid crystal display panel, including an array substrate of claim 11.

16. The array substrate of claim 11, wherein the larger the distance between the first shield electrode and the data signal line in a direction perpendicular to the array substrate is, the larger the orthographic projection of the first shield electrode on the base substrate is.

17. A display device, including the liquid crystal display panel of claim 15.

18. The array substrate of claim 16, wherein the pixel electrode is slit-shaped or plate-shaped, and the common electrode is slit-shaped.

19. The array substrate of claim 16, further including a second insulating layer provided between the thin film transistor and the pixel electrode.

20. The array substrate of claim 16, further including a resin layer provided between the thin film transistor and the pixel electrode.

* * * * *